(12) United States Patent
Yatomi et al.

(10) Patent No.: US 7,934,867 B2
(45) Date of Patent: May 3, 2011

(54) STIRRING APPARATUS

(75) Inventors: Ryuichi Yatomi, Saijo (JP); Shoji Morinaga, Saijo (JP)

(73) Assignee: Sumitomo Heavy Industries Process Equipment Co., Ltd., Ehime (JP)

( * ) Notice: Subject to any disclaimer, the term of this patent is extended or adjusted under 35 U.S.C. 154(b) by 1028 days.

(21) Appl. No.: 11/663,515

(22) PCT Filed: Sep. 15, 2005

(86) PCT No.: PCT/JP2005/017032
§ 371 (c)(1),
(2), (4) Date: Mar. 21, 2007

(87) PCT Pub. No.: WO2006/033277
PCT Pub. Date: Mar. 30, 2006

(65) Prior Publication Data
US 2008/0101156 A1 May 1, 2008

(30) Foreign Application Priority Data

Sep. 21, 2004 (JP) .................................. 2004-273582

(51) Int. Cl.
*B01F 7/32* (2006.01)
*B01F 7/20* (2006.01)

(52) U.S. Cl. ................................ 366/325.93; 416/231 A

(58) Field of Classification Search ............. 366/325.93, 366/343; 416/231 A
See application file for complete search history.

(56) References Cited

U.S. PATENT DOCUMENTS

| | | | | |
|---|---|---|---|---|
| 179,809 A | * | 7/1876 | Meister | 165/94 |
| 301,754 A | * | 7/1884 | Powell | 366/325.93 |
| 513,156 A | * | 1/1894 | Taylor | 74/398 |
| 575,905 A | * | 1/1897 | Saxer | 366/285 |
| 716,474 A | * | 12/1902 | Price | 261/37 |
| 751,187 A | * | 2/1904 | Lewiak | 165/109.1 |
| 930,364 A | * | 8/1909 | Edwards | 74/420 |
| 969,018 A | * | 8/1910 | Willmann | 165/109.1 |
| 995,001 A | * | 6/1911 | Hathaway | 366/286 |
| 1,054,201 A | * | 2/1913 | Hathaway | 366/276 |
| 1,070,728 A | * | 8/1913 | Preston | 366/296 |
| 2,440,727 A | * | 5/1948 | Rosmait | 162/342 |
| 2,572,375 A | * | 10/1951 | Oertli | 366/315 |
| 2,871,000 A | * | 1/1959 | Dowling | 366/289 |

(Continued)

FOREIGN PATENT DOCUMENTS

| | | |
|---|---|---|
| BE | 1012363 A3 | 10/2000 |
| DE | 10353140 A1 | 9/2004 |
| DE | 69918787 T2 | 1/2005 |
| EP | 0 461 746 A2 | 12/1991 |

(Continued)

*Primary Examiner* — David L Sorkin
*Assistant Examiner* — Andrew Janca
(74) *Attorney, Agent, or Firm* — The Webb Law Firm

(57) ABSTRACT

A mixer capable of developing suitable stirring characteristics by forming a sufficient vertical circulation flow over the entire part of the inside of a tank, wherein an opening is formed in a stirring blade under the following conditions: (i) the ratio of the opening area of the opening in the upper half of the stirring blade to the overall area of the upper part of the stirring blade (the opening rate in the upper half of the stirring blade) is 45 to 80%, (ii) the ratio of the opening area of the opening in the lower half of the stirring blade to the overall area of the lower half of the stirring blade (the opening rate in the lower half of the stirring blade) is 18 to 50%, and (iii) the ratio of the opening rate in the lower half of the stirring blade to the opening rate in the upper half of the stirring blade is 31 to 71%.

2 Claims, 15 Drawing Sheets

U.S. PATENT DOCUMENTS

| | | | |
|---|---|---|---|
| 3,158,359 A * | 11/1964 | Stiffler | 416/231 R |
| 3,280,764 A * | 10/1966 | Potter et al. | 425/202 |
| 3,434,804 A * | 3/1969 | Babington | 422/135 |
| 4,065,107 A * | 12/1977 | Van Horbek | 366/343 |
| 4,312,596 A * | 1/1982 | Maezawa et al. | 366/343 |
| 4,372,002 A * | 2/1983 | Small | 8/156 |
| 4,449,826 A * | 5/1984 | Mathis et al. | 366/13 |
| 5,102,229 A | 4/1992 | Wada et al. | |
| 5,354,129 A * | 10/1994 | Yowell | 366/343 |
| 6,403,519 B1 | 6/2002 | Francois et al. | |
| 2001/0002891 A1* | 6/2001 | Frankel et al. | 366/146 |
| 2001/0006487 A1 | 7/2001 | Akamine et al. | |
| 2007/0297274 A1* | 12/2007 | Ondracek | 366/129 |
| 2010/0278007 A1* | 11/2010 | Tanguy et al. | 366/343 |

FOREIGN PATENT DOCUMENTS

| | | |
|---|---|---|
| EP | 1013676 A1 | 6/2000 |
| EP | 1258502 A2 | 11/2002 |
| JP | 01-037173 B2 | 9/1986 |
| JP | 04-215829 A | 8/1992 |
| JP | 07000786 A | 1/1995 |
| JP | 08252444 A | 10/1996 |
| JP | 10-033966 A | 2/1998 |
| JP | 10-174857 A | 6/1998 |
| JP | 11267484 A | 10/1999 |
| JP | 2000191716 A | 7/2000 |

* cited by examiner

FIG. 3

| Opening Ratio in the Upper Half | Opening Ratio in the Lower Half | Evaluation Result | Opening Ratio in the Upper Half | Opening Ratio in the Lower Half | Evaluation Result |
|---|---|---|---|---|---|
| 45.1% | 18.1% | △ | 42.0% | 20.0% | × |
| 45.1% | 24.1% | △ | 42.0% | 28.0% | × |
| 52.6% | 19.8% | △ | 45.0% | 35.0% | × |
| 52.6% | 35.6% | △ | 50.1% | 0.0% | × |
| 58.1% | 42.1% | △ | 50.1% | 33.8% | × |
| 59.3% | 39.6% | △ | 50.1% | 42.2% | × |
| 67.5% | 52.2% | △ | 51.4% | 10.0% | × |
| 73.7% | 24.8% | △ | 51.4% | 37.9% | × |
| 73.7% | 46.2% | △ | 51.4% | 44.9% | × |
| 73.7% | 57.8% | △ | 52.6% | 42.0% | × |
| 74.6% | 51.9% | △ | 52.6% | 47.5% | × |
| 75.4% | 57.4% | △ | 56.9% | 0.0% | × |
| 79.0% | 43.3% | △ | 56.9% | 46.9% | × |
| 51.4% | 24.9% | ○ | 58.1% | 11.1% | × |
| 51.4% | 29.9% | ○ | 58.1% | 49.8% | × |
| 52.6% | 31.7% | ○ | 59.3% | 22.0% | × |
| 56.9% | 20.1% | ○ | 59.3% | 46.6% | × |
| 56.9% | 26.8% | ○ | 59.3% | 52.7% | × |
| 56.9% | 37.5% | ○ | 65.4% | 0.0% | × |
| 58.1% | 27.7% | ○ | 65.4% | 52.5% | × |
| 58.1% | 33.2% | ○ | 66.4% | 12.4% | × |
| 59.3% | 35.2% | ○ | 66.4% | 55.8% | × |
| 65.4% | 22.5% | ○ | 67.5% | 24.6% | × |
| 65.4% | 30.0% | ○ | 67.5% | 59.0% | × |
| 65.4% | 42.0% | ○ | 73.7% | 0.0% | × |
| 66.4% | 31.0% | ○ | 74.6% | 13.6% | × |
| 66.4% | 37.2% | ○ | 74.6% | 61.4% | × |
| 66.4% | 47.1% | ○ | 75.4% | 27.1% | × |
| 67.5% | 39.4% | ○ | 75.4% | 65.0% | × |
| 67.5% | 44.3% | ○ | 82.0% | 55.0% | × |
| 73.7% | 33.0% | ○ | 83.0% | 45.0% | × |
| 74.6% | 34.1% | ○ | 85.0% | 25.0% | × |
| 74.6% | 40.9% | ○ | 85.0% | 35.0% | × |
| 75.4% | 48.7% | ○ | | | |

FIG. 5

| Ratio of the Opening Ratios in the Upper and Lower Halves | Mixing Time (Sec) | Ratio of the Mixing Time |
|---|---|---|
| 18.3% | 4.6 | 148.4% |
| 18.7% | 4.9 | 158.1% |
| 30.0% | 4.1 | 132.3% |
| 15.0% | 5.3 | 171.0% |
| 45.8% | 3.1 | 100.0% |
| 46.7% | 3.3 | 106.5% |
| 47.7% | 2.7 | 87.1% |
| 38.0% | 2.9 | 93.5% |
| 54.9% | 2.8 | 90.3% |
| 56.0% | 3.0 | 96.8% |
| 57.2% | 3.1 | 100.0% |
| 58.2% | 3.3 | 106.5% |
| 69.6% | 4.0 | 129.0% |
| 70.9% | 3.4 | 109.7% |
| 72.4% | 3.6 | 116.1% |
| 72.8% | 4.7 | 151.6% |
| 82.4% | 4.7 | 151.6% |
| 84.0% | 5.0 | 161.3% |
| 85.8% | 4.2 | 135.5% |
| 87.3% | 5.5 | 177.4% |

FIG. 7

| Ratio of the Opening Ratios in the Upper and Lower Halves | Ratio of the Mixing Time | Ratio of the Opening Ratios in the Upper and Lower Halves | Ratio of the Mixing Time |
|---|---|---|---|
| 30.0% | 121.7% | 52.0% | 98.2% |
| 31.0% | 119.5% | 53.0% | 98.3% |
| 32.0% | 117.4% | 54.0% | 98.6% |
| 33.0% | 115.5% | 55.0% | 99.0% |
| 34.0% | 113.6% | 56.0% | 99.5% |
| 35.0% | 111.8% | 57.0% | 100.0% |
| 36.0% | 110.2% | 58.0% | 100.7% |
| 37.0% | 108.6% | 59.0% | 101.5% |
| 38.0% | 107.2% | 60.0% | 102.4% |
| 39.0% | 105.8% | 61.0% | 103.5% |
| 40.0% | 104.6% | 62.0% | 104.6% |
| 41.0% | 103.5% | 63.0% | 105.8% |
| 42.0% | 102.5% | 64.0% | 107.1% |
| 43.0% | 101.6% | 65.0% | 108.6% |
| 44.0% | 100.8% | 66.0% | 110.1% |
| 45.0% | 100.1% | 67.0% | 111.8% |
| 46.0% | 99.5% | 68.0% | 113.5% |
| 47.0% | 99.0% | 69.0% | 115.4% |
| 48.0% | 98.6% | 70.0% | 117.4% |
| 49.0% | 98.4% | 71.0% | 119.5% |
| 50.0% | 98.2% | 72.0% | 121.7% |
| 51.0% | 98.1% | | |

PRIOR ART

PRIOR ART

STIRRING APPARATUS

TECHNICAL FIELD

The present invention relates to a stirring apparatus that is intended to be used for mixing, dissolution, crystallization, reaction, etc.

BACKGROUND ART

Hitherto, there are many cases where small-sized blades, such as turbine blades, paddle blades and propeller blades are disposed at multiple stages when in use as a stirring impeller of a stirring apparatus. According to a stirring apparatus using these blades, the rate of the fluid flow pumped in the radial direction from the blades is increased by increasing the rotational speed of the impeller, so that the fluid strikes against a tank wall, and then turns upwards and downwards, thereby creating a circulation flow returning again to the impeller, and thus mixing the inside of the tank.

However, the small-sized blades hardly create a satisfactory vertical circulation flow throughout the inside of the tank, as illustrated in FIG. 14, and thereby creating plural isolated zones in the vertical direction, so that the stirring characteristics cannot be improved as expected. In addition, these impellers tend to have complicated shapes, which causes increase in manufacturing costs and makes them difficult to wash.

Contrarily to this, a flat plate type impeller disclosed in, for example, Patent Document 1 has a simplified impeller shape, and thus has merits of lowering the manufacturing cost and allowing for ease of washing, as well as a merit of producing good stirring characteristics because of a high rate of the fluid flow pumped in the radial direction from the impeller throughout the inside of the tank, so that it is suitable for stirring treatment of particularly highly viscous fluid, and fluid containing solid matters that are easy to precipitate onto a tank bottom.

Patent Document 1: Japanese Unexamined Patent Application Publication No. Hei-10-174857

SUMMARY OF THE INVENTION

Problems to be Solved by the Invention

However, even with the flat shape type impeller, as long as it is the one described in Patent Document 1, or of a completely flat shape without an opening, the rate of the fluid flow pumped in the radial direction from an upper half of the impeller is equal to that from a lower half, so that a flow pumped from the upper half of the impeller towards the downside strikes against a flow pumped from the lower half of the impeller towards the upside. Thus, isolated zones are necessarily created in the vertical direction and the stirring characteristics are deteriorated.

Accordingly, it is an object of the present invention to provide a stirring apparatus that is capable of creating a satisfactory vertical circulation flow throughout the inside of the tank, and exhibiting appropriate stirring characteristics.

Means for Solving the Problems

According to the present invention, there is provided a stirring apparatus comprising a stirred tank 1, a stirring shaft 2 that is disposed within the stirred tank 1 along an axis thereof so as to be rotatable from the outside of the stirred tank, and a flat plate like and rectangular shaped stirring impeller 3 that is mounted to the stirring shaft 2, which is characterized in that the stirring impeller 3 has plural openings 4, . . . satisfying the following conditions: (i) the ratio of the opening area of the openings 4 in an upper half U of the stirring impeller 3 relative to the total area of the upper half U of the stirring impeller 3 (the opening ratio in the upper half U of the stirring impeller 3) is from 45 to 80%; (ii) the ratio of the opening area of the openings 4 in a lower half D of the stirring impeller 3 relative to the total area of the lower half D of the stirring impeller (3) (the opening ratio in the lower half D of the stirring impeller 3) is from 18 to 50%; and (iii) the ratio of the opening ratio in the lower half D of the stirring impeller 3 relative to the opening ratio in the upper half U of the stirring impeller 3 is from 31 to 71%.

According to the stirring apparatus having the above structure, the opening ratio in the upper half U of the stirring impeller 3 is larger, while the opening ratio in the lower half D is smaller, so that the flow rate of a stirring subject (an object to be stirred) pumped in the radial direction from the lower half D is higher than the flow rate of the stirring object pumped in the radial direction from the upper half U. Thus, a vertical circulation flow from an area with a strong pumping action exerted therefrom to an area with a weak pumping action exerted therefrom, that is, a vertical circulation flow continuing from the lower side to the upper side, of the stirred tank 1 can be created. As a result, no isolated zones are created so that the stirring object can be entirely stirred.

ADVANTAGES OF THE INVENTION

The stirring apparatus of the present invention is capable of creating a satisfactory vertical circulation flow throughout the inside of the tank and exhibiting appropriate stirring characteristics by increasing the opening ratio in the upper half of the stirring impeller, decreasing the opening ratio in the lower half, and optimizing these opening ratios.

BRIEF DESCRIPTION OF THE DRAWINGS

FIG. 3 illustrates a data table of the stirring characteristics (mixing characteristics) based on the relationship between the opening ratios in the upper and lower halves, of a stirring impeller.

FIG. 5 illustrates a data table of the relationship between the ratio of the opening ratio in the lower half relative to the opening ratio in the upper half, of the stirring impeller, and the ratio of the mixing time.

FIG. 7 illustrates a data table of an approximating curve in FIG. 6.

DESCRIPTION OF REFERENCE NUMERALS

1: stirred tank, 2: stirring shaft, 3: stirring impeller, 4: opening, 5: baffle plate, R1, R2: vertical circulation flows, Q1, Q2: pumped fluid flow

BEST MODE FOR CARRYING OUT THE INVENTION

Figure 1:
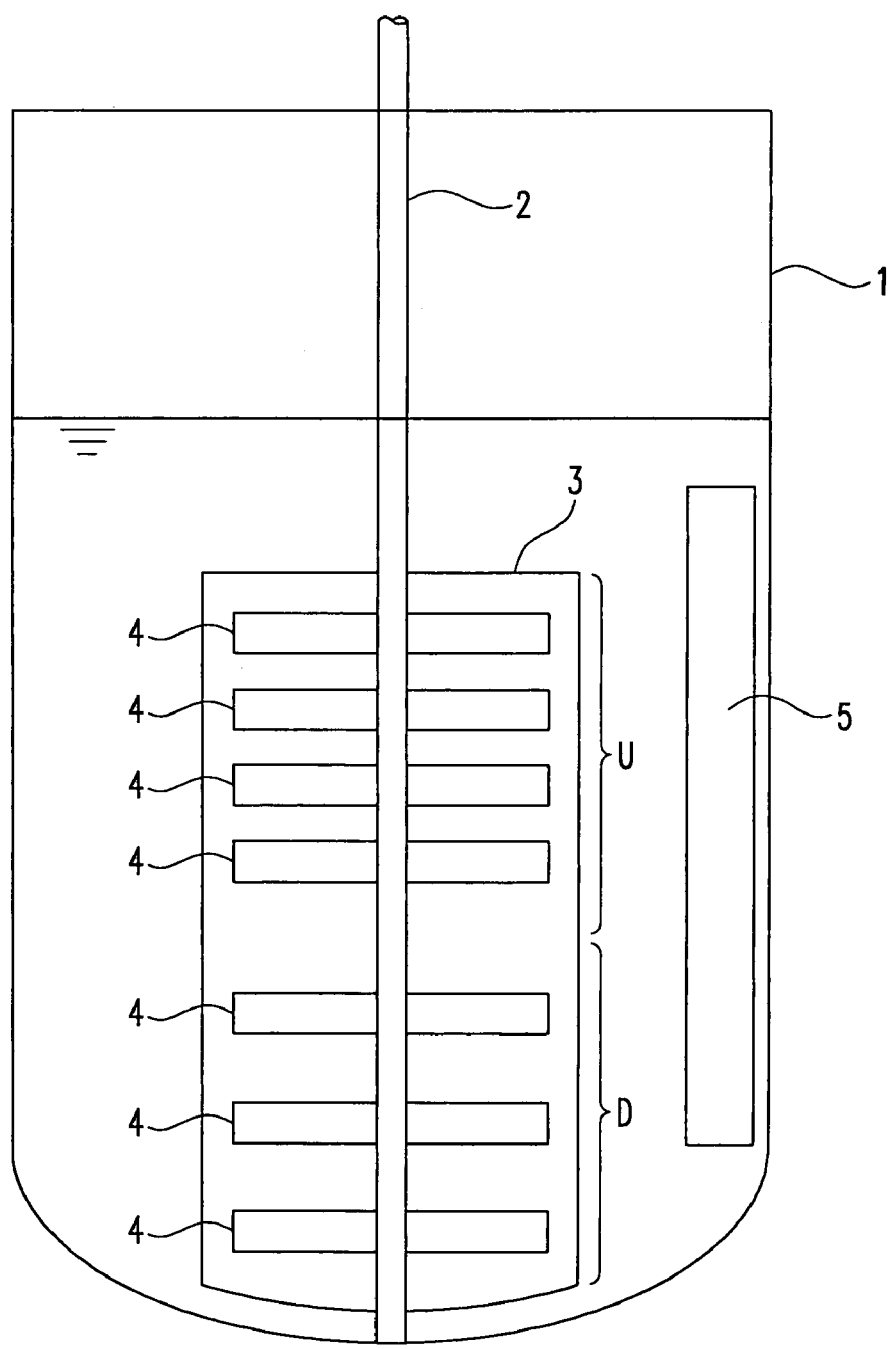
FIG. 1 illustrates a front view of a stirring apparatus according to an embodiment of the present invention.

Now, the description will be made for a stirring apparatus of an embodiment of the present invention with reference to FIG. 1.

A reference numeral 1 represents a cylindrical stirred tank with a stirring shaft 2 disposed within the tank 1 along an axis thereof. The stirring shaft 2 has a lower end supported via a bearing (not shown) disposed on the tank bottom, and an upper end connected via a coupling (not shown) to a driving unit (not shown) on the top of the tank.

A reference numeral 3 represents a flat plate like stirring impeller that has plural openings 4 and a rectangular shape, and is mounted to the stirring shaft 2 along the center line of the width of the stirring impeller 3. The number of the openings 4 located in an upper half U is greater than the number of the openings 4 located in a lower half D so that the opening ratio in the upper half U of the stirring impeller 3 (the ratio of the total opening area relative to the total area (including the total opening area of the openings 4 in the upper half U) of the upper half U of the stirring impeller 3) is greater than the opening ratio in the lower half D of the stirring impeller 3 (the ratio of the total opening area relative to the total area (including the total opening area of the openings 4 in the lower half D) of the lower half D of the stirring impeller 3. In this embodiment, the four openings 4 are arranged at a given distance from each other in the upper half U of the stirring impeller 3, and the three openings 4 are arranged at a given distance from each other in the lower half D of the stirring impeller 3, each opening 4 having the same opening area.

A reference numeral 5 represents baffle plates mounted to a side wall of the stirred tank and disposed at a given distance from each other in the circumferential direction (in Figures, only a single baffle plate is shown). These baffle plates 5 each have a continuous form extending from the lower side to the upper side, of the side wall of the stirred tank 1 in the axial direction thereof, so that it has a capability of moving a stirring object pumped from the stirring impeller 3 upwards to the upper side of the stirred tank 1.

The stirring apparatus of this embodiment has thus the above structure. Now, the description will be made for the stirring characteristics of the stirring apparatus of this embodiment with reference to FIG. 2.

It is generally known that the flow rate of the stirring object pumped in the radial direction from the stirring impeller is proportional to the product of the area per unit width of the stirring impeller 3 in the axial direction of the stirring impeller 3 and the third power of the impeller diameter of the said area per unit width. Accordingly, likewise the stirring impeller 3 of this embodiment, in a case where the opening ratio in the upper half U of the stirring impeller 3 is greater and the opening ratio in the lower half D of the stirring impeller 3 is smaller, the pumped fluid flow Q1 of the stirring object in the lower half D is greater than the pumped fluid flow Q2 of the stirring object in the upper half U.

Due to the difference in the flow rate pumped out between in the upper half U and in the lower half D, of the stirring impeller 3, that is, the difference in the pumping force therebetween, there is created a vertical circulation flow R1 from an area with a strong pumping force to an area with a weak pumping force, that is, the vertical circulation flow R1 continuing from the lower side to the upper side, of the stirred tank 1. As a result, no isolated zones are created so that the stirring object can be entirely stirred, and thus better stirring characteristics can be obtained.

The vertical circulation flow R1 once reached the upper portion shifts towards the center from the side wall of the stirred tank 1, and turns to be a vertical circulation flow R2 that moves downwards along the stirring shaft 2 and the stirring impeller 3, and then returns to a tank bottom portion. Since the plural openings 4 are formed in the stirring impeller 3, the stirring object when it is being moving downwards is sheared into segments by those openings 4, and the segmented stirring object rolls up into minute vortices generated on the downstream side of the rotational direction of the stirring impeller 3 and thus stirred into smaller segments.

Figure 2:
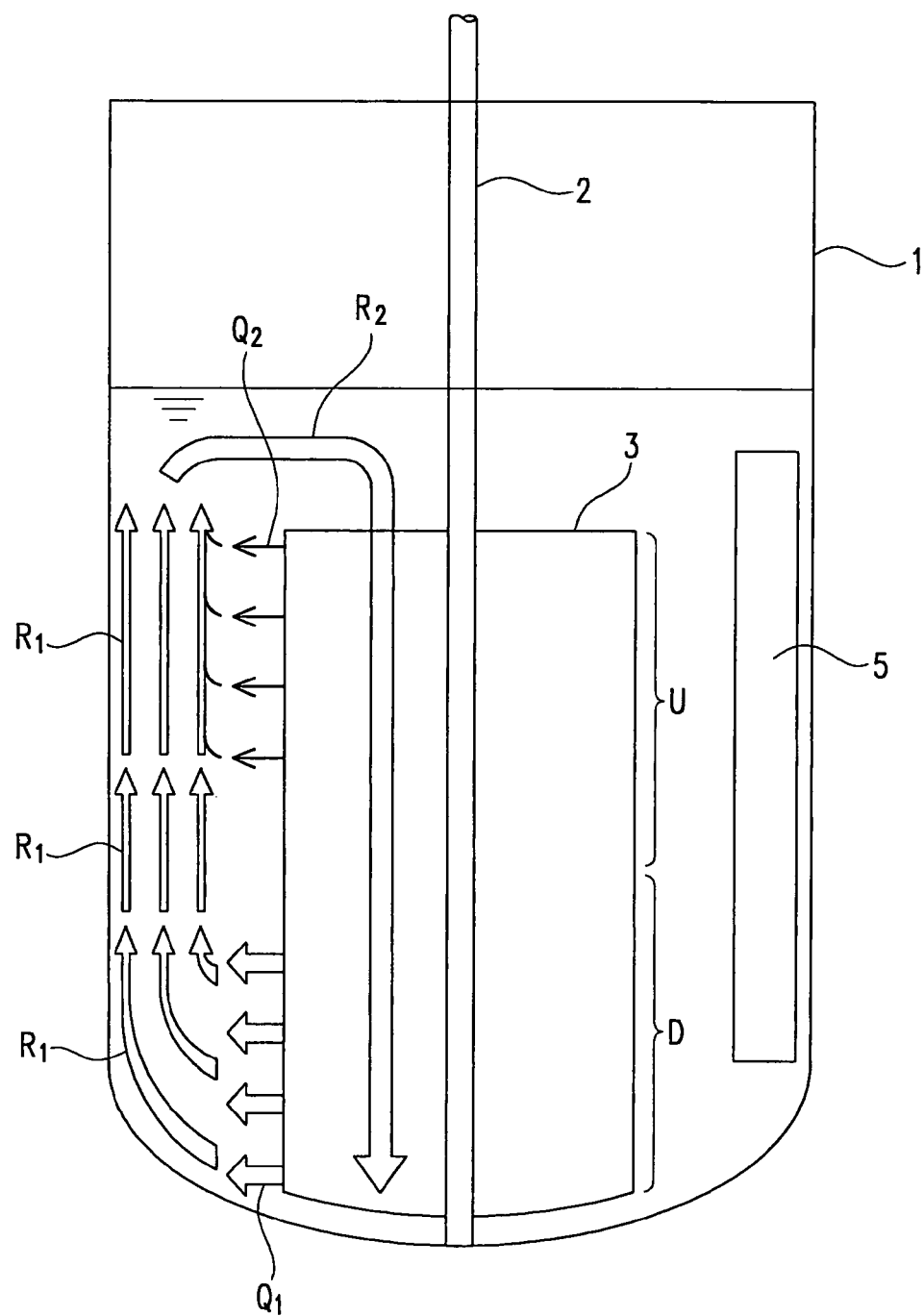
FIG. 2 illustrates a conceptual diagram for explanation of the stirring characteristics of the stirring apparatus of the embodiment.

In FIG. 2, for ease of understanding, the pumped fluid flows (pumped flows) Q1, Q2, and the vertical circulation flows R1, R2 are illustrated on one side only. It is a matter of course that similar fluid flows are created over an entire area in the circumferential direction of the stirred tank 1.

The present inventors made various experiments to find out an appropriate manner to set the opening ratio of the stirring impeller 3.

Figure 4:
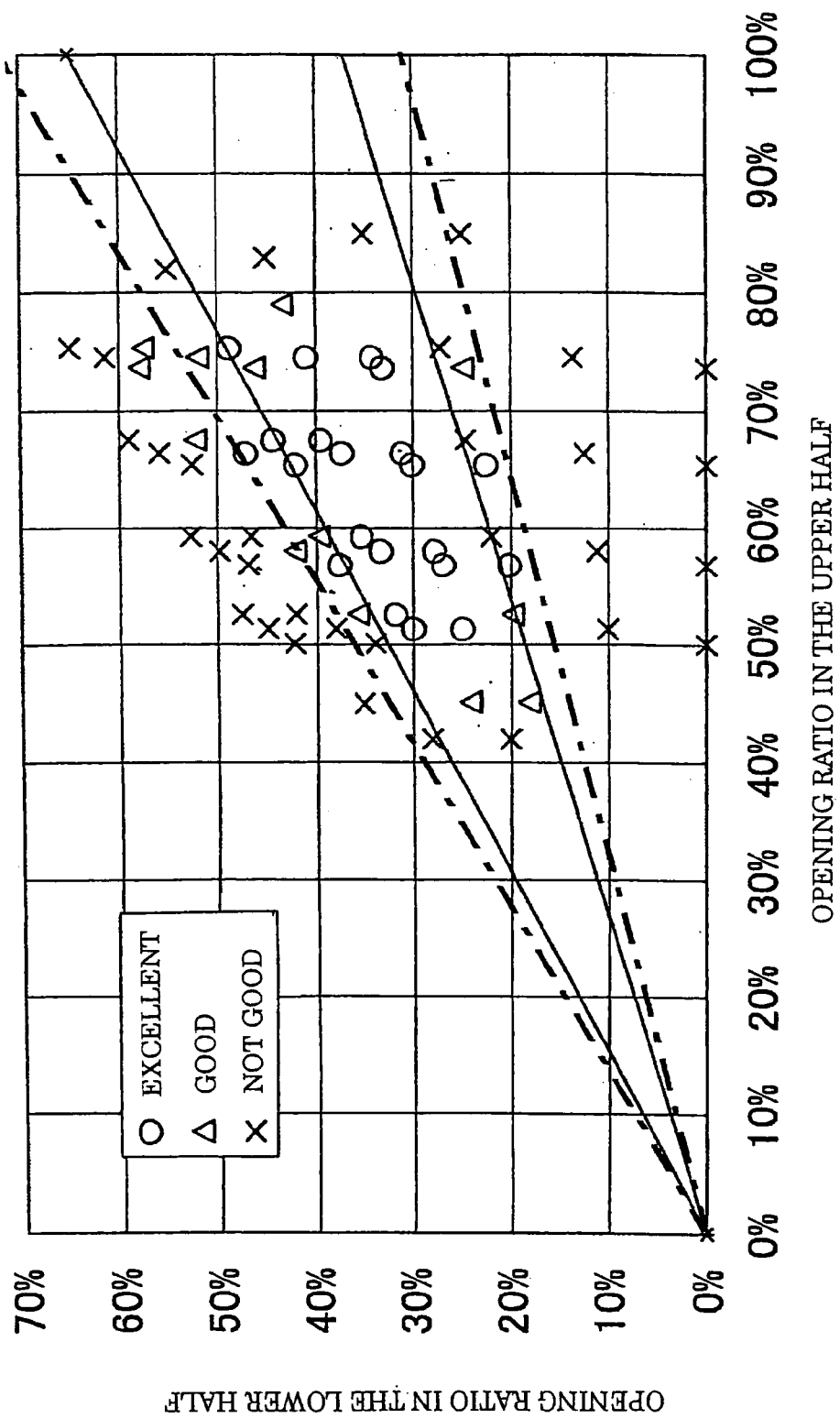
FIG. 4 illustrates a graph showing the quality of the stirring characteristics (mixing characteristics) based on the relationship between the opening ratios in the upper and lower halves, of the stirring impeller.

As a result of the following experiments, FIG. 4 was made by plotting the result of the experiments (FIG. 3) and drawing boundary lines.

<Conditions of the Experiments>

Tank inner diameter D (Inner diameter of a body of the stirred tank 1): 310 mm

Impeller diameter d (Width of the stirring impeller 3): 165 mm

Impeller height B (Height from the lowermost position of the tank bottom to the uppermost end of the stirring impeller 3): 295 mm Fluid depth L (Height from the lowermost position of the tank bottom to the fluid surface): 357 mm Shape of the tank bottom: semi-oval shape Baffle plate: Presence Amount of fluid: 25 litters Fluid viscosity: 1 cp (water)

Stirring power: $0.2$ kW/m$^3$

<Method of Experiments>

A fluid flowing condition is observed by using an iodine titration decolorization method. Specifically, a fluid within the stirred tank 1 is colored burned sienna with iodine, a decoloring agent is put thereinto and they are stirred, during which the progress of decolorization of the fluid inside the tank and the presence and absence of isolated zones are observed (VCR recording). This method is a known method disclosed in, for example, "Mixing (1975) Shinji NAGATA John Wiley & Sons, P 187, 4.3.1 Method of Measuring Mixer Performance", and "Handbook of Industrial Mixing, John Willy & Sons, P 167, 4-4.3 Approximate Mixing Time Measurement with Colorimetric methods". In the evaluations, a symbol "○" represents that a fluid flow pumped from the lower side of the stirred tank 1 smoothly reached the upper side and a vertically continuing, single vertical circulation flow was created; a symbol "Δ" represents that a fluid flow pumped from the lower side of the stirred tank 1 mostly reached the upper side, but before reaching, a portion thereof deviated towards the center portion; and a symbol "x" represents that a vertical circulation flow was apparently broken down into sections.

Figure 6:
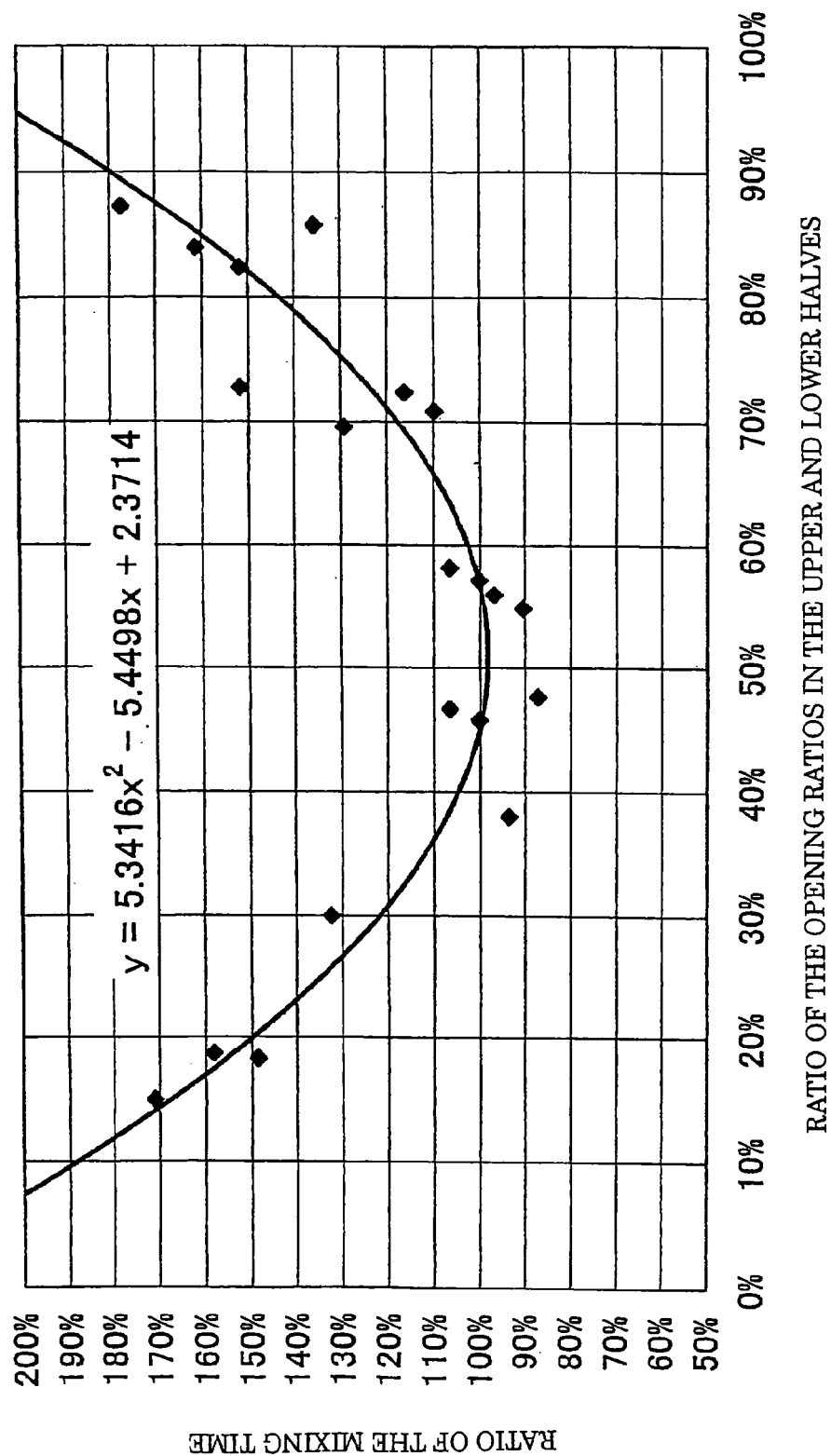
FIG. 6 illustrates a graph showing the relationship between the ratio of the opening ratio in the lower half relative to the opening ratio in the upper half, of the stirring impeller, and the ratio of the mixing time.

The same experiment was made by the same conditions, in which a fluid inside of the tank was stirred and the time elapsed before the fluid was completely decolorized was measured. FIG. 6 was made by plotting the experiment results (FIG. 5) and drawing an approximating curve. The ratio of the mixing time is meant a ratio of each mixing time where the optimum value of the mixing time (3.1 sec in the experiment) was designated as 100%, and the ratio of the opening ratios of the upper and lower halves is meant the ratio of the opening ratio in the lower half D of the stirring impeller 3 relative to the opening ratio in the upper half U of the stirring impeller D. The optimum value (average value) of the mixing time is meant a value obtained by averaging ten mixing-time data in an area in which the mixing time is being shortened. Specifically, among the data from the 5th (3.1 sec) to the 14th (4.0 sec) from the top in FIG. 5, the 13th data (4.0 sec) is excluded as a significant point, and the residual 9 data are averaged. FIG. 7 illustrates the data of the approximating curve.

It can be seen from FIGS. 3 and 4 that as long as the opening ratio in the upper half U of the stirring impeller 3 is from 45 to 80%, the opening ratio in the lower half D is from 18 to 50%, and the ratio of the opening ratios in the upper and lower halves of the stirring impeller 3 is from 31 to 71% (an area held between y=0.31x and y=0.71x, where y represents a vertical axis and x represents a horizontal axis), the fluid flowing condition (mixing characteristics) is good; and as long as the ratio of the opening ratios in the upper and lower halves of the stirring impeller 3 is limited to 37 to 65% (an area held between y=0.37x and y=0.65x), the fluid flowing condition (mixing characteristics) can become better.

It can be seen from FIGS. 6 and 7 that the ratio of the mixing time falls within a range of 110% or lower when the ratio of the opening ratios in the upper and lower halves of the stirring impeller 3 is from 37 to 65%; and the ratio of the mixing time falls within a range of 120% or lower when the ratio of the opening ratios in the upper and lower halves of the stirring impeller 3 is from 31 to 71%. This fact is in conformity with the above fact derived from FIGS. 3 and 4.

From the above, the opening ratio of the stirring impeller 3 is preferably set so that (1) the opening ratio in the upper half U of the stirring impeller 3 is from 45 to 80% while the opening ratio in the lower half D is from 18 to 50%, and the ratio of the opening ratios in the upper and lower halves of the stirring impeller 3 is from 31 to 71%, and is further preferably set so that (2) the opening ratio in the upper half U of the stirring impeller 3 is from 45 to 80% while the opening ratio in the lower half D is from 18 to 50%, and the ratio of the opening ratios in the upper and lower halves of the stirring impeller 3 is from 37 to 65%.

The stirring apparatus of the present invention is not necessarily limited to the above embodiment, but can be varied within a range not departing from the scope of the present invention.

For example, in the above embodiment, the ratio of the opening ratios in the upper and lower halves is 31% or higher, more preferably in a range of from 37% to 71% and still more preferably in a range of from 37% to 65%. When considering having the ratio of the mixing time falling within a range of 100% or lower, the above ratio is further preferably in a range of from 46% to 56%, and when considering having the ratio of the mixing time being falling within a range of less than 99%, it is further preferably in a range of from 48% to 54%.

In the above embodiment, the opening ratio in the upper half U is 45% or higher but 80% or lower. However, when considering only those evaluated as "○", the opening ratio in the upper half U is preferably 50% or higher but 76% or lower.

Figure 8:
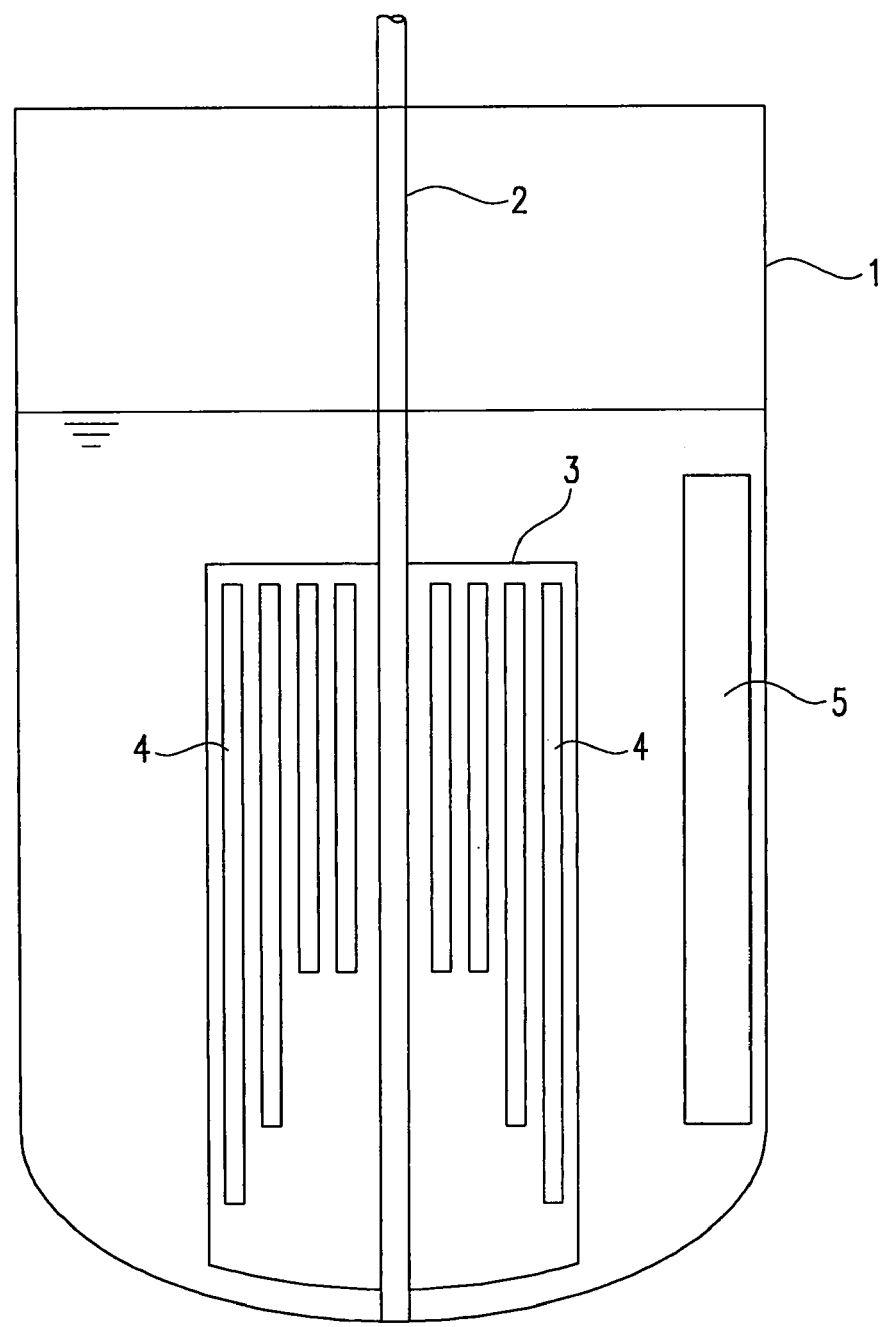
FIG. 8 illustrates a front view of a stirring apparatus according to another (1st) embodiment.
Figure 9:
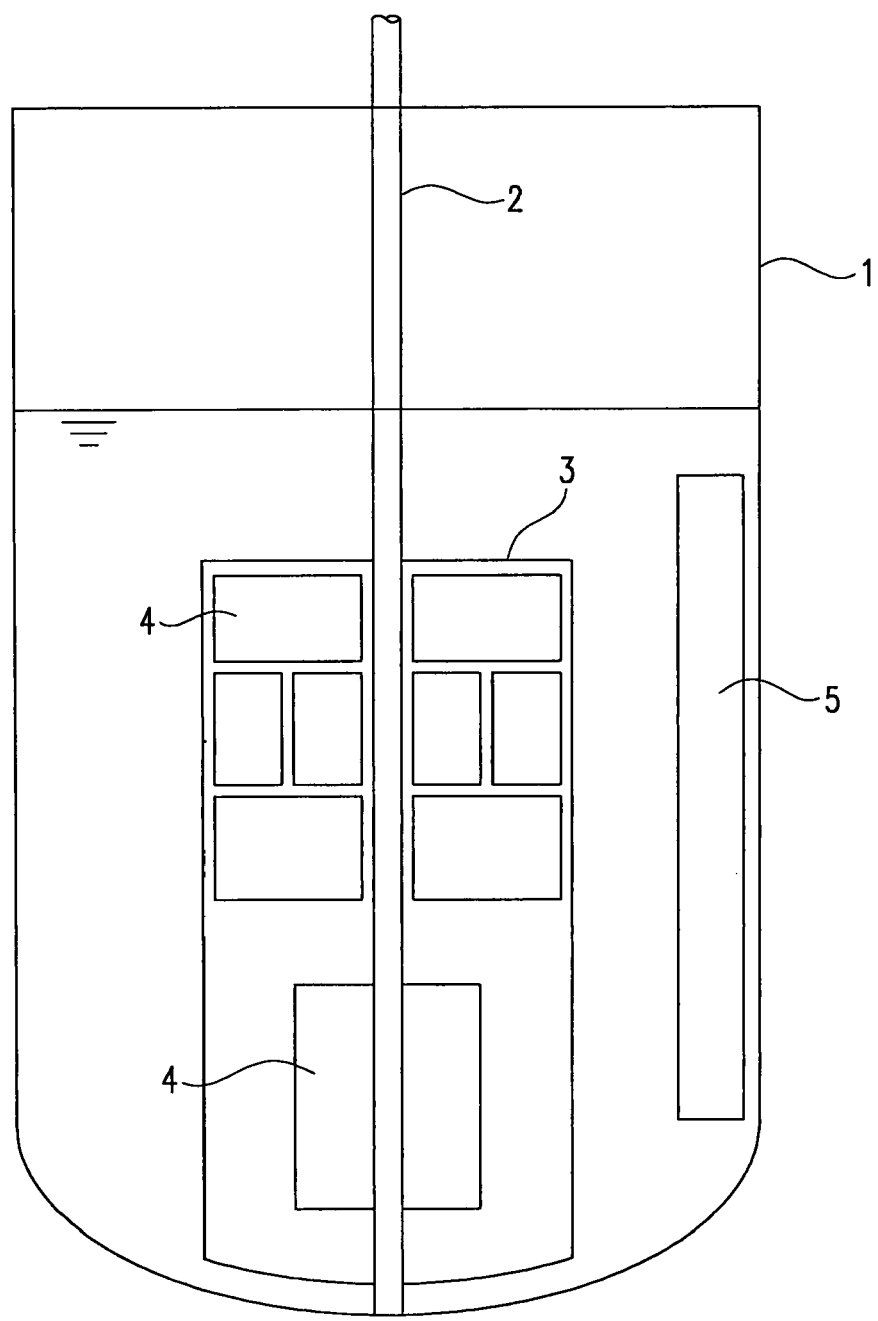
FIG. 9 illustrates a front view of a stirring apparatus according to another (2nd) embodiment.
Figure 10:
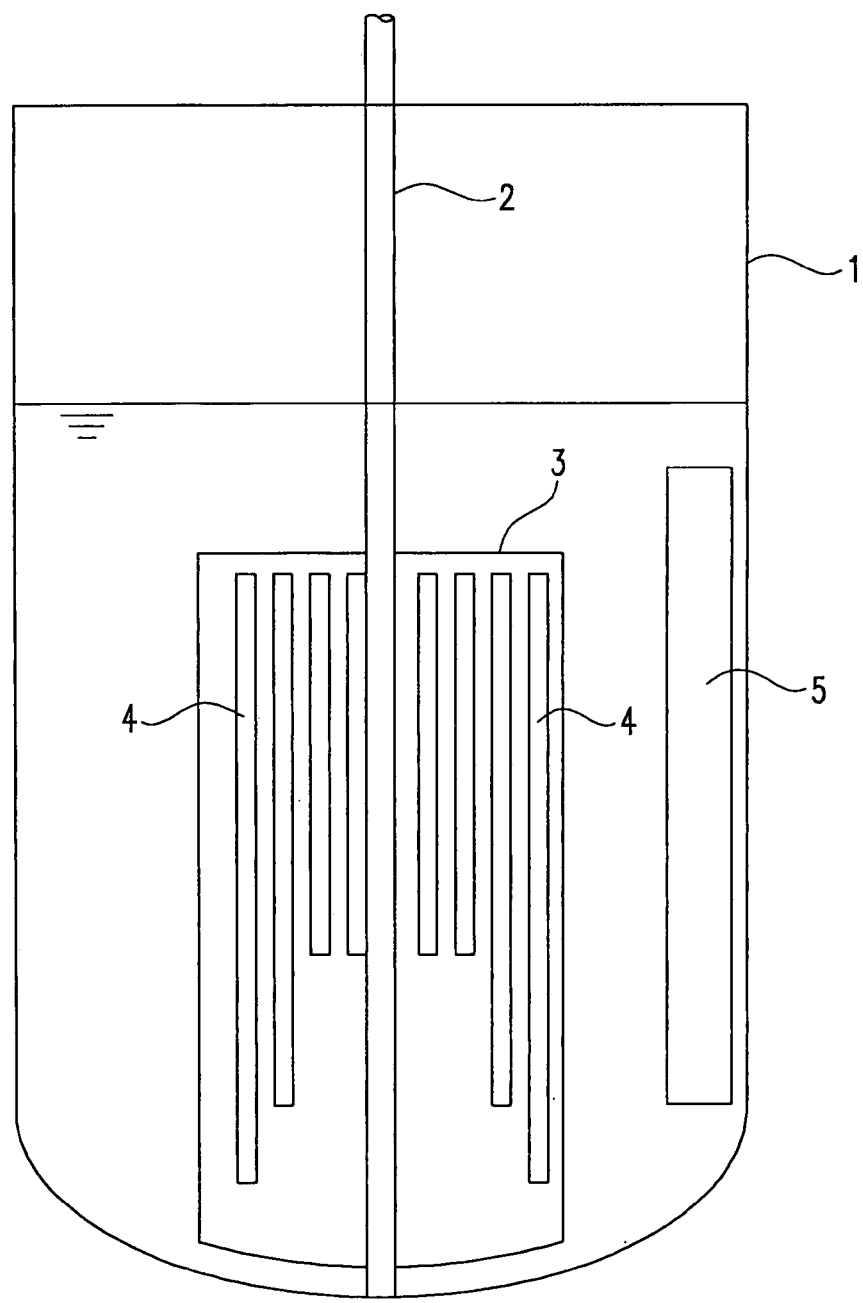
FIG. 10 illustrates a front view of a stirring apparatus according to another (3rd) embodiment.
Figure 11:
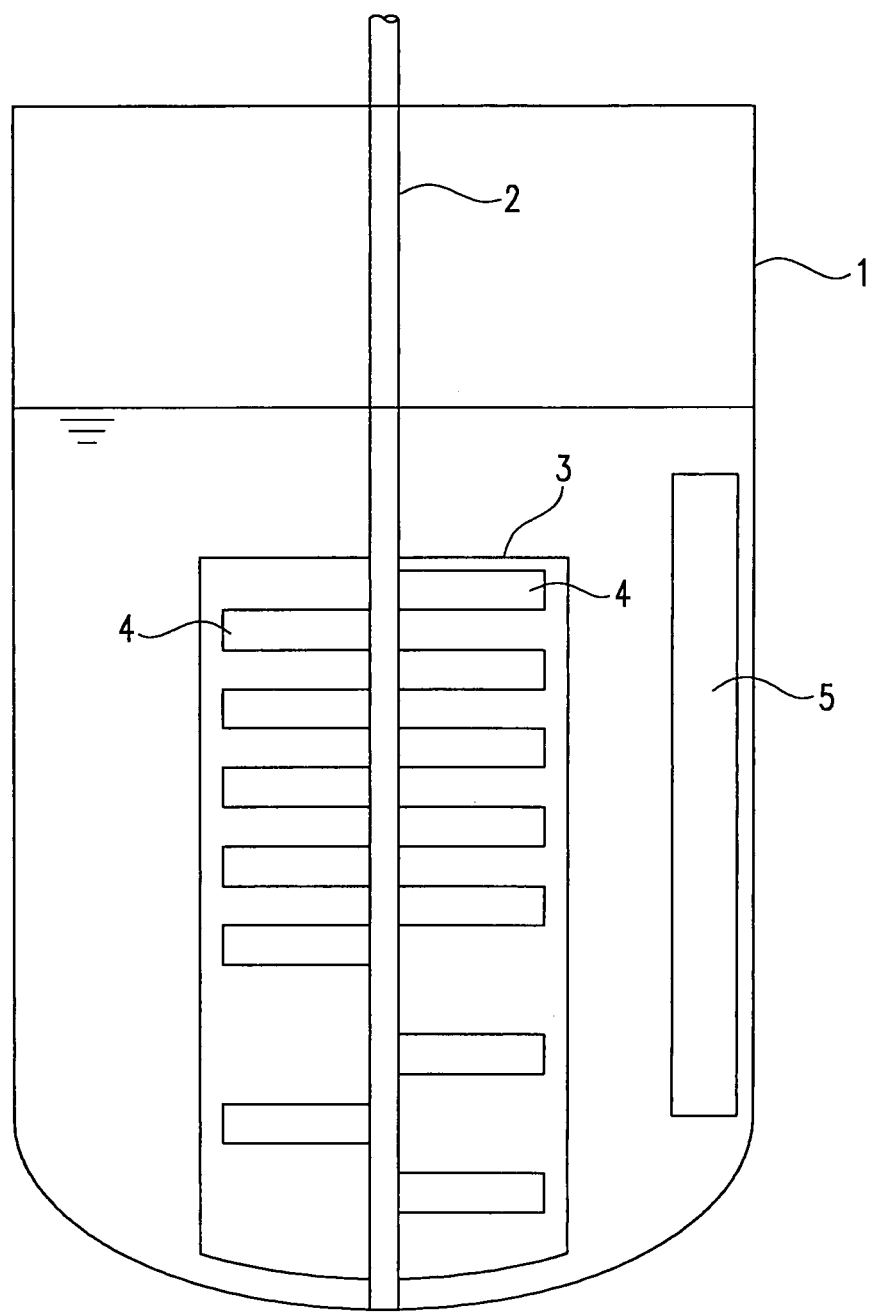
FIG. 11 illustrates a front view of a stirring apparatus according to another (4th) embodiment.
Figure 12:
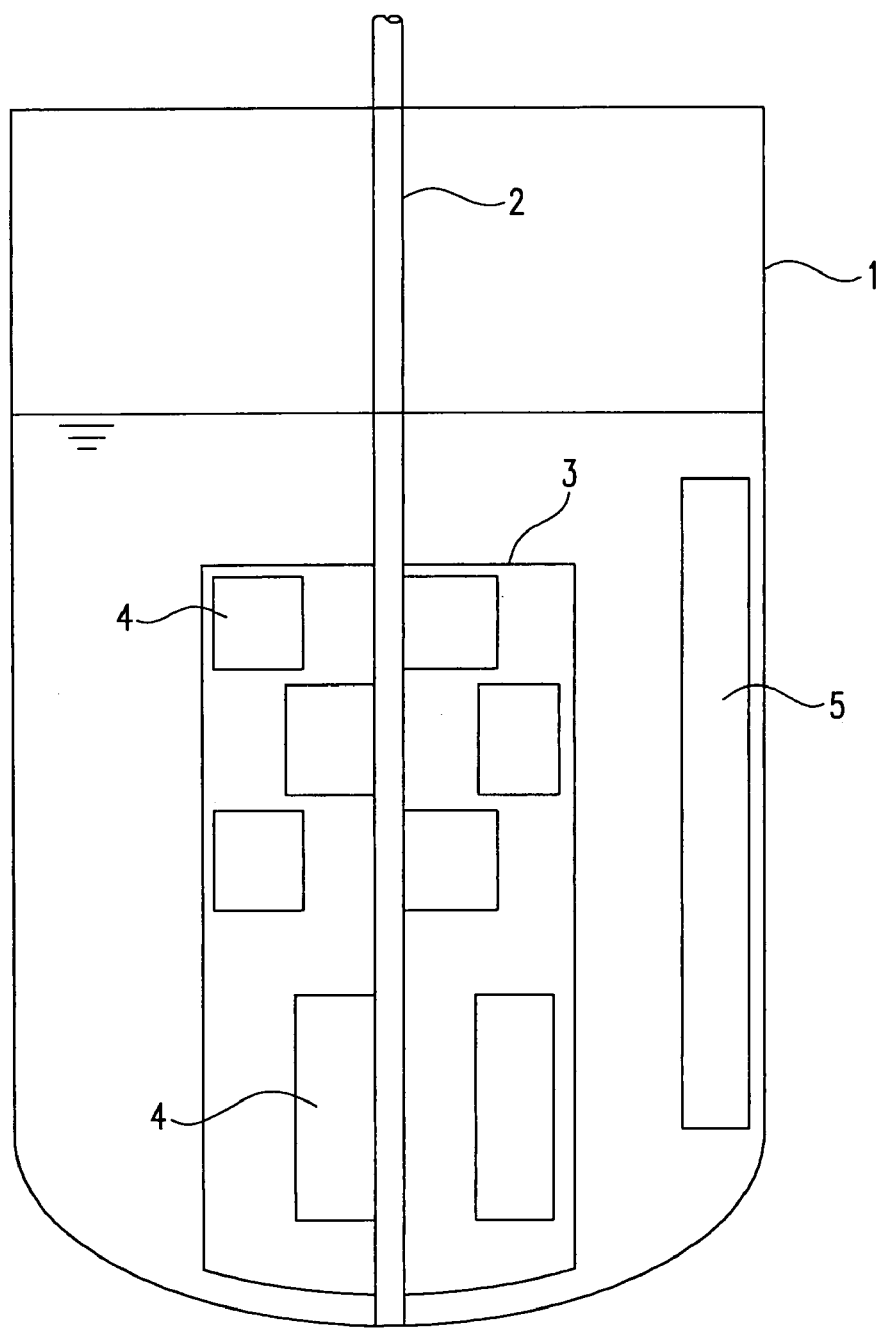
FIG. 12 illustrates a front view of a stirring apparatus according to another (5th) embodiment.
Figure 13:
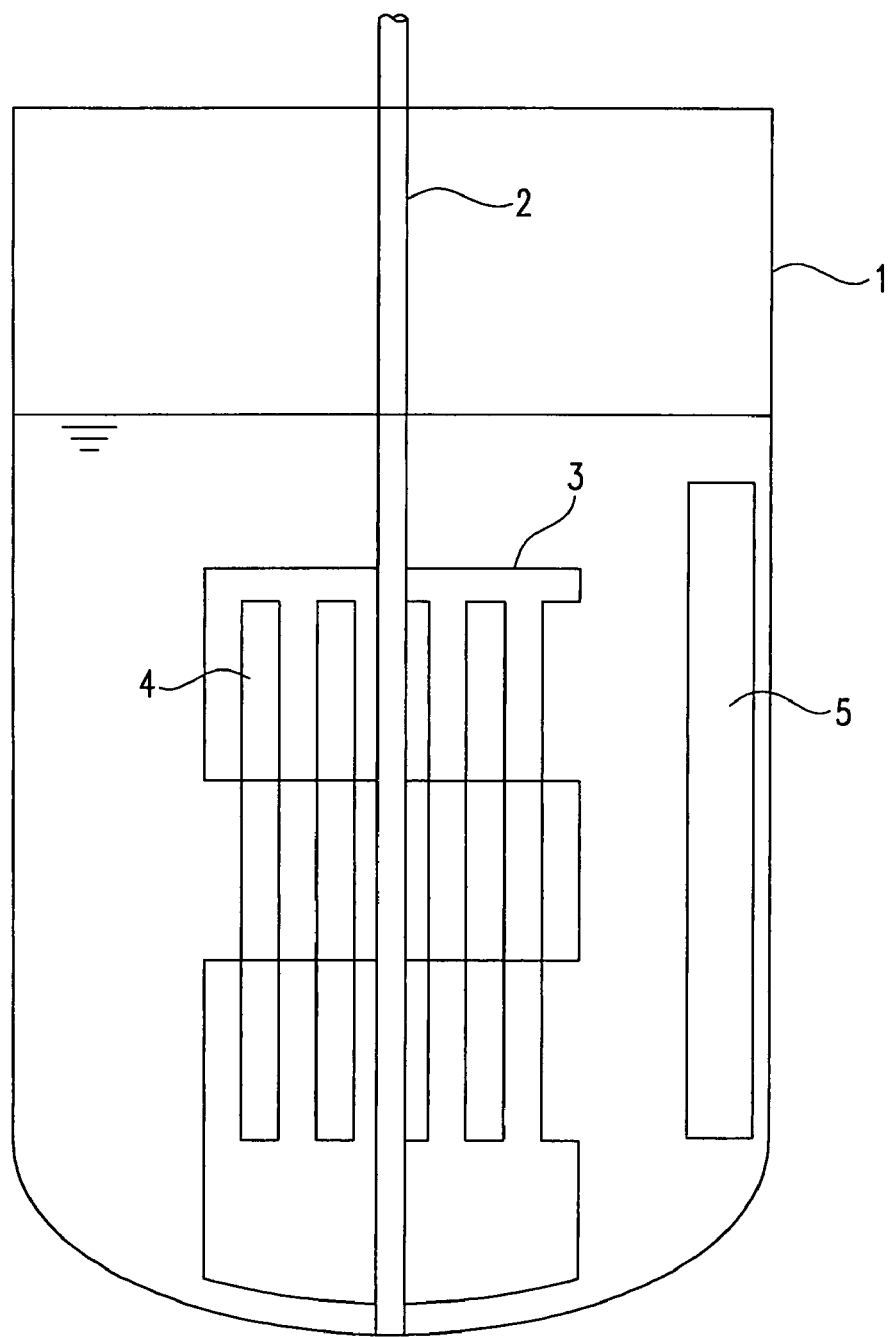
FIG. 13 illustrates a front view of a stirring apparatus according to another (6th) embodiment.
Figure 14:
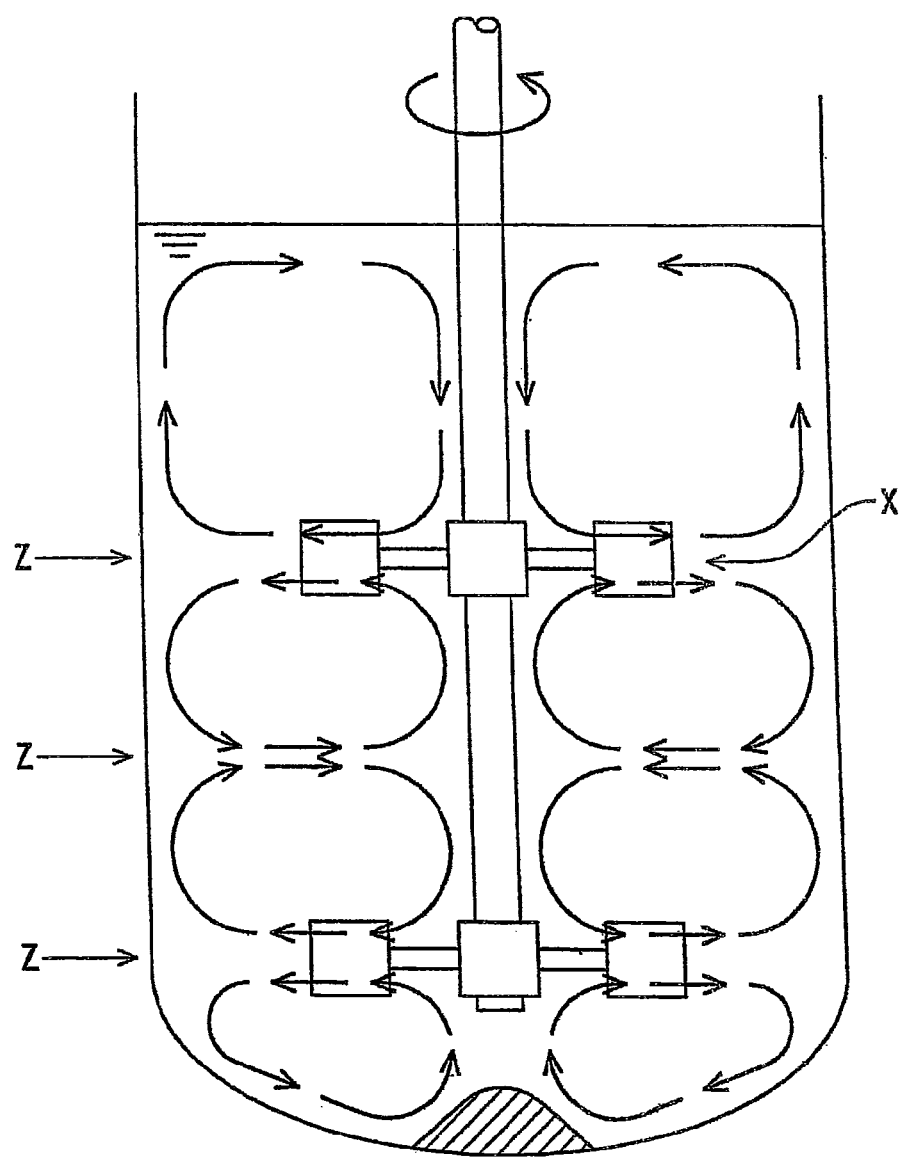
FIG. 14 illustrates a schematic diagram for explanation of the stirring characteristics of a stirring apparatus having conventional small-sized blades.
Figure 15:
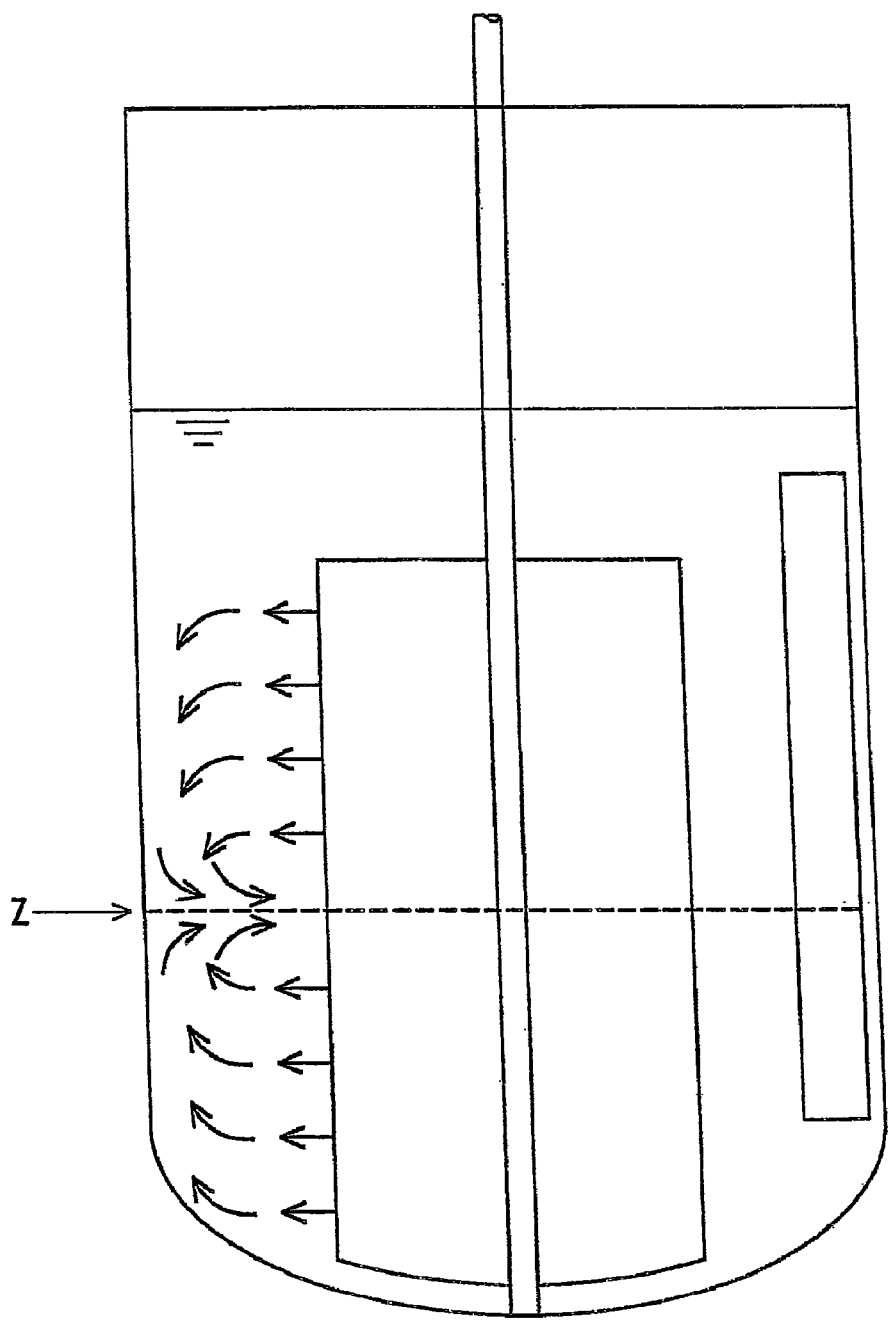
FIG. 15 illustrates a schematic diagram for explanation of the stirring characteristics of a stirring apparatus having a conventional large-sized blade.

In the above embodiment, the openings 4 each having a horizontally long rectangular shape are arranged to be aligned with each other. However, it is not necessary to limit the openings 4 to a specific shape, number or arrangement, as long as the opening ratio in the upper half U of the stirring impeller 3 is larger than the opening ratio in the lower half D, as shown in FIG. 8 in which the openings 4 each having a vertically long slit shape are laterally aligned (in which the openings 4 have different lengths to cause a difference in opening ratio between the upper half and the lower half), in FIG. 9 in which the openings 4 have respectively different sizes and are appropriately arranged, in FIG. 10 in which the openings 4 are asymmetrically arranged about the stirring shaft 2, in FIG. 11 in which the openings 4 of the light hand side are out of alignment with the openings 4 of the right hand side with the stirring shaft 2 therebetween, along the shaft length direction, in FIG. 12 in which the openings 4 are arranged in zigzag fashion in the shaft length direction, and in FIG. 13 in which the openings 4 are arranged in a checkered pattern.

In the above embodiment, the openings are formed by boring holes in a plate material; however for example it is possible to combine structural members together thereby forming a flat plate and hence a rectangular stirring impeller with clearances between the structural members formed as the openings.

In the above embodiment, the lower end of the stirring shaft 2 is supported on the tank bottom; however it is possible to employ an arrangement with the lower end located away from the tank bottom and not supported thereon.

In the above embodiment, the driving unit is disposed on the top of the tank for rotating the stirring shaft 2 from the outside of the tank; however the driving unit may be disposed on the side of the tank bottom.

In the above embodiment, the baffle plates 5 are disposed; however these baffle plates 5 are not essential elements in the present invention.

It is not necessary to limit the tank inner diameter D, the impeller diameter d, the impeller height B and the fluid depth L to specific values; however they may be set in general to have the ratio of the impeller diameter d/D (impeller diameter d/tank inner diameter D) being from 40 to 75%, the ratio of the impeller height B/D (impeller height B/tank inner diameter D) being from 50 to 100% and the ratio of the fluid depth L/D (liquid depth L/tank inner diameter D) being from 10 to 150%.

The invention claimed is:

1. A stirring apparatus comprising a stirred tank, a stirring shaft that is disposed within the stirred tank along an axis thereof so as to be rotatable from the outside of the stirred tank, and a flat plate like and generally rectangular shaped stirring impeller that is mounted to the stirring shaft, the stirring apparatus being characterized in that the stirring impeller has plural openings satisfying the following conditions:

(i) the ratio of the opening area of the openings in an upper half of the stirring impeller relative to the total area of the upper half of the stirring impeller (the opening ratio in the upper half of the stirring impeller) is from 45 to 80%;
(ii) the ratio of the opening area of the openings in a lower half of the stirring impeller relative to the total area of the lower half of the stirring impeller (the opening ratio in the lower half of the stirring impeller) is from 18 to 50%; and
(iii) the ratio of the opening ratio in the lower half of the stirring impeller relative to the opening ratio in the upper half of the stirring impeller is from 46 to 56%.

2. The stirring apparatus according to claim 1, wherein the openings are asymmetrically arranged about the stirring shaft.

* * * * *